(12) United States Patent
Tanaka et al.

(10) Patent No.: US 9,538,354 B2
(45) Date of Patent: Jan. 3, 2017

(54) MOBILE COMMUNICATION SYSTEM, MOBILE STATION, CALL CONTROL DEVICE, AND MOBILE COMMUNICATION METHOD

(71) Applicant: NTT DOCOMO, INC., Tokyo (JP)

(72) Inventors: Itsuma Tanaka, Tokyo (JP); Shinya Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/022,470

(22) PCT Filed: Sep. 12, 2014

(86) PCT No.: PCT/JP2014/074300
§ 371 (c)(1),
(2) Date: Mar. 16, 2016

(87) PCT Pub. No.: WO2015/041183
PCT Pub. Date: Mar. 26, 2015

(65) Prior Publication Data
US 2016/0227391 A1 Aug. 4, 2016

(30) Foreign Application Priority Data
Sep. 18, 2013 (JP) .................................. 2013-192643

(51) Int. Cl.
*H04M 11/04* (2006.01)
*H04W 4/22* (2009.01)
(Continued)

(52) U.S. Cl.
CPC ............. *H04W 4/22* (2013.01); *H04M 3/5116* (2013.01); *H04W 4/18* (2013.01); *H04M 2242/04* (2013.01)

(58) Field of Classification Search
CPC .... H04W 4/22; H04W 8/245; H04M 1/72519; H04M 2242/04
(Continued)

(56) References Cited

U.S. PATENT DOCUMENTS 8,798,603 B2* 8/2014 Hawkins ........... H04M 3/42348
455/404.2
9,084,102 B1* 7/2015 Singh ...................... H04W 4/22
(Continued)

FOREIGN PATENT DOCUMENTS

| JP | 2009-544200 A | 12/2000 |
| JP | 2001-127913 A | 5/2001 |
| JP | 2008-048123 A | 2/2008 |

OTHER PUBLICATIONS

International Search Report issued in PCT/JP2014/074300 mailed on Nov. 18, 2014 (2 pages).
(Continued)

*Primary Examiner* — Danh Le
(74) *Attorney, Agent, or Firm* — Osha Liang LLP

(57) ABSTRACT

The invention provides a mobile communication system, a mobile station, a call control device, and a mobile communication method that are capable of allowing an emergency call, even to which a prefix indicating how to treat the emergency call is added, to break through access control, and applying priority control to the emergency call, as in the case of a normal emergency call without the addition of the prefix. UE (100) separates acquired calling number information into a prefix and a calling number, and sends an MSC (210) an Emergency Setup which includes the prefix and an Emergency Category linked with the calling number. The MSC (210) determines how to treat the emergency call (such as to block notification of a telephone number of a calling party) based on the prefix included in the Emergency Setup,
(Continued)

and connects the emergency call to a PSAP (400) corresponding to the Emergency Category.

8 Claims, 11 Drawing Sheets

(51) Int. Cl.
*H04M 3/51* (2006.01)
*H04W 4/18* (2009.01)

(58) Field of Classification Search
USPC .................. 455/404.2, 550.1, 418; 379/45
See application file for complete search history.

(56) References Cited

U.S. PATENT DOCUMENTS

| | | | | |
|---|---|---|---|---|
| 2008/0152092 A1* | 6/2008 | Barton | ............... | H04L 29/06027 379/45 |
| 2008/0159181 A1* | 7/2008 | Anderson | ............... | H04L 12/66 370/271 |
| 2009/0116467 A1 | 5/2009 | Shi et al. | | |
| 2010/0009665 A1* | 1/2010 | Hawkins | ........... | H04M 3/42348 455/417 |
| 2010/0172345 A1* | 7/2010 | Bjorsell | ................ | H04M 7/006 370/352 |
| 2011/0124311 A1* | 5/2011 | Stahlin | ................ | G08B 25/016 455/404.2 |
| 2012/0115448 A1* | 5/2012 | Rosenhaft | ............ | G06Q 10/087 455/414.1 |
| 2013/0086518 A1* | 4/2013 | Park | ....................... | H04L 67/12 715/808 |
| 2013/0143514 A1 | 6/2013 | Jayanna | | |
| 2014/0146957 A1* | 5/2014 | Thange | ............... | H04M 3/4228 379/221.14 |

OTHER PUBLICATIONS

Written Opinion of the International Searching Authority issued in PCT/JP2014/074300 mailed on Nov. 18, 2014 (4 pages).
3GPP TS 24.008 V8.16.0; "3rd Generation Partnership Project; Technical Specification Group Core Network and Terminals; Mobile radio interface Layer 3 specification; Core network protocols; Stage 3 (Release 8)"; Mar. 2012 (593 pages).
3GPP TS 24.229 V11.3.0; "3rd Generation Partnership Project; Technical Specification Group Core Network and Terminals; IP multimedia call control protocol based on Session Initiation Protocol (SIP) and Session Description Protocol (SDP); Stage 3 (Release 11)"; Mar. 2012 (728 pages).

* cited by examiner

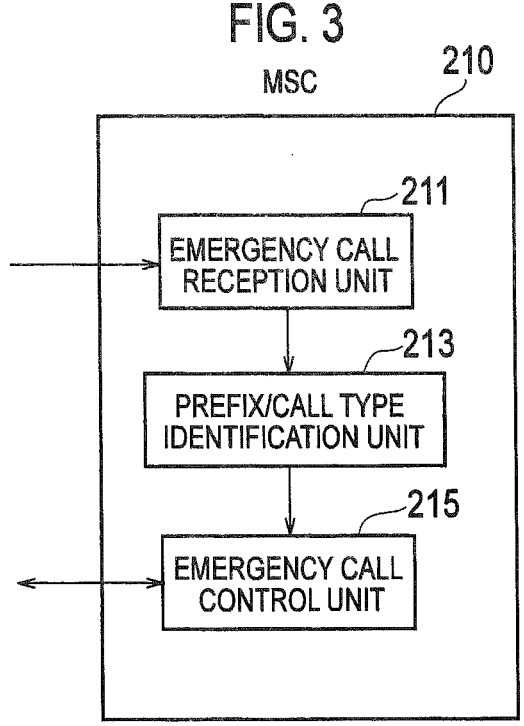
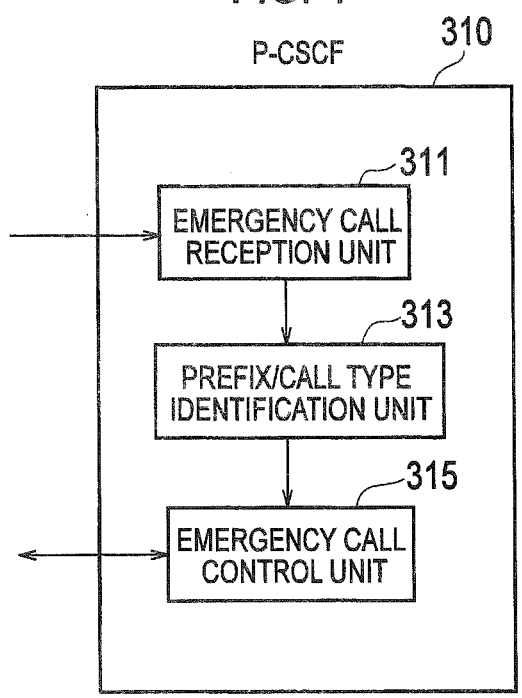

| NUMBER | PREFIX | EMERGENCY CALL NUMBER |
|---|---|---|
| 184110 | 184 | 110 |
| 186110 | 186 | 110 |
| 184119 | 184 | 119 |
| 186119 | 186 | 119 |
| ⋮ | | |

(b)

| PREFIX |
|---|
| 184 |
| 186 |
| ⋮ |

MOBILE COMMUNICATION SYSTEM, MOBILE STATION, CALL CONTROL DEVICE, AND MOBILE COMMUNICATION METHOD

TECHNICAL FIELD

The present invention relates to a mobile communication system, a mobile station, a call control device, and a mobile communication method, which treat emergency calls to police departments, fire departments, and the like.

BACKGROUND ART

3rd Generation Partnership Project (3GPP) defines the use of an Emergency Setup message in 3G mode when a mobile station (UE) transmits an emergency call to a police department, a fire department, an emergency medical service, or the like (see Non-patent document 1, for example).

The Emergency Setup message does not define an information element (IE) that indicates a telephone number of a called party (a calling number). Here, an Emergency Category (such as fire or ambulance) linked with the calling number (such as 119) is selected and the Emergency Setup message including the Emergency Category is transmitted from the mobile station to an MSC (Mobile services Switching Center, which is a call control device). Note that the above-described method of processing an emergency call also applies to Long Term Evolution (LTE) mode although LTE uses an INVITE message in accordance with the Session Initial Protocol (SIP) instead of the Emergency Setup message.

In the meantime, from the viewpoint of personal information protection, communication common carriers are obligated to allow a calling party of such an emergency call to choose whether or not to notify a called party, i.e., a Public Safety Answering Point (PSAP, or an emergency call answering point), of a telephone number of the calling party (see http://www.soumu.go.jp/main_sosiki/joho_tsusin/d_syohi/tele com_perinfo_guideline_intro.html, for example).

For this reason, the calling number with the addition of a prefix (184 in Japan, for example), which indicates whether or not to notify the called party of the telephone number of the calling party, may be inputted as calling number information (such as 184119) to the mobile station by the calling party. As mentioned above, the Emergency Setup message (or the INVITE message) is not usable to notify the call control device of the above-mentioned calling number information with the addition of the prefix. Accordingly, when the above-mentioned calling number information is inputted, the mobile station notifies the call control device of the calling number information by treating the call as a general call instead of the emergency call. Thus, the mobile station controls notification of the telephone number of the calling party to the called party.

PRIOR ART DOCUMENT

Non-Patent Document

Non-patent document 1: 3GPP TS 24.008 V8.16.0 Subclause 9.3.8 Emergency setup, 3rd Generation Partnership Project; Technical Specification Group Core Network and Terminals; Mobile radio interface Layer 3 specification; Core network protocols; Stage 3 (Release 11), 3GPP, March 2012

SUMMARY OF THE INVENTION

However, the above-described conventional method of processing an emergency call has the following problem. Specifically, some emergency calls are treated as the general calls although they are actually emergency calls. Therefore, if the mobile communication system is operated under access control to permit emergency calls only, there is a problem that such emergency calls may not break through the access control or may not be prioritized in priority control intended for such an emergency call.

The present invention has been made in view of the aforementioned circumstances. An objective of the present invention is to provide a mobile communication system, a mobile station, a call control device, and a mobile communication method that are capable of allowing an emergency call, even to which a prefix indicating how to treat the emergency call is added, to break through access control or applying priority control to the emergency call, as in the case of a normal emergency call without the addition of the prefix thereto.

In summary, a first aspect of the present invention provides a mobile communication system including: a mobile station; and a call control device configured to control connection of an emergency call initiated by the mobile station. The mobile station includes: a calling number information acquisition unit configured to acquire calling number information including a prefix indicating how to treat the emergency call, and a calling number being a telephone number of a called party; a prefix/calling number separation unit configured to separate the calling number information acquired by the calling number information acquisition unit into the prefix and the calling number; and an emergency call transmission unit configured to send the call control device the emergency call in the form of an emergency call transmission signal including the prefix separated by the prefix/calling number separation unit, and an emergency call type linked with the calling number. The call control device includes: an emergency call reception unit configured to receive from the mobile station the emergency call in the form of the emergency call transmission signal; a prefix/call type identification unit configured to identify the prefix and the emergency call type included in the emergency call transmission signal; and an emergency call control unit configured to determine how to treat the emergency call based on the prefix identified by the prefix/call type identification unit, and to connect the emergency call to an emergency call answering point corresponding to the emergency call type based on the emergency call type identified by the prefix/call type identification unit.

In summary, a second aspect of the present invention provides a mobile station configured to initiate an emergency call, including: a calling number information acquisition unit configured to acquire calling number information including a prefix indicating how to treat the emergency call, and a calling number being a telephone number of a called party; a prefix/calling number separation unit configured to separate the calling number information acquired by the calling number information acquisition unit into the prefix and the calling number; and an emergency call transmission unit configured to send a call control device configured to control connection of the emergency call. The emergency call in the form of an emergency call transmission signal includes the prefix separated by the prefix/calling number separation unit, and an emergency call type linked with the calling number.

In summary, a third aspect of the present invention provides a call control device configured to control connection of an emergency call initiated by a mobile station, including: an emergency call reception unit configured to receive from the mobile station the emergency call in the form of an emergency call transmission signal including a prefix indicating how to treat the emergency call, and an emergency call type linked with a calling number being a telephone number of a called party; a prefix/call type identification unit configured to identify the prefix and the emergency call type included in the emergency call transmission signal; and an emergency call control unit configured to determine how to treat the emergency call based on the prefix identified by the prefix/call type identification unit, and to connect the emergency call to an emergency call answering point corresponding to the emergency call type based on the emergency call type identified by the prefix/call type identification unit.

In summary, a fourth aspect of the present invention provides a mobile communication method implemented by a mobile station and a call control device configured to control connection of an emergency call initiated by the mobile station. The method includes the steps of: causing the mobile station to acquire calling number information including a prefix indicating how to treat the emergency call, and a calling number being a telephone number of a called party; causing the mobile station to separate the acquired calling number information into the prefix and the calling number; causing the mobile station to send the call control device the emergency call in the form of an emergency call transmission signal including the separated prefix, and an emergency call type linked with the calling number; causing the call control device to receive from the mobile station the emergency call in the form of the emergency call transmission signal; causing the call control device to identify the prefix and the emergency call type included in the emergency call transmission signal; and causing the call control device to determine how to treat the emergency call based on the identified prefix, and to connect the emergency call to an emergency call answering point corresponding to the emergency call type based on the identified emergency call type.

In summary, a fifth aspect of the present invention provides a mobile communication system including: a mobile station; and a call control device configured to control connection of an emergency call initiated by the mobile station. The mobile station includes: a calling number information acquisition unit configured to acquire calling number information including a prefix indicating how to treat the emergency call, and a calling number being a telephone number of a called party; and an emergency call transmission unit configured to send the call control device the emergency call in the form of an emergency call transmission signal including the prefix and the calling number acquired by the calling number information acquisition unit. The call control device includes: an emergency call reception unit configured to receive from the mobile station the emergency call in the form of the emergency call transmission signal; a prefix/calling number identification unit configured to identify the prefix and the calling number included in the emergency call transmission signal; and an emergency call control unit configured to determine how to treat the emergency call based on the prefix identified by the prefix/calling number identification unit, and to connect the emergency call to an emergency call answering point corresponding to the calling number based on the calling number identified by the prefix/calling number identification unit.

In summary, a sixth aspect of the present invention provides a mobile communication method implemented by a mobile station and a call control device configured to control connection of an emergency call initiated by the mobile station. The method includes the steps of: causing the mobile station to acquire calling number information including a prefix indicating how to treat the emergency call, and a calling number being a telephone number of a called party; causing the mobile station to send the call control device the emergency call in the form of an emergency call transmission signal including the acquired prefix, and the acquired calling number; causing the call control device to receive from the mobile station the emergency call in the form of the emergency call transmission signal; causing the call control device to identify the prefix and the calling number included in the emergency call transmission signal; and causing the call control device to determine how to treat the emergency call based on the identified prefix, and to connect the emergency call to an emergency call answering point corresponding to the calling number based on the identified calling number.

BRIEF DESCRIPTION OF THE DRAWINGS

FIG. 3 is a functional block configuration diagram of an MSC 210 according to the first embodiment of the present invention.

FIG. 4 is a functional block configuration diagram of a P-CSCF 310 according to the first embodiment of the present invention.

FIG. 8 is a chart showing examples of prefix setting information held by a setting information holding unit 105 according to the first embodiment of the present invention.

MODES FOR CARRYING OUT THE INVENTION

Next, an embodiment of the present invention will be described. Note that, in the following description of the

First Embodiment

(1) Overall Schematic Configuration of Mobile Communication System

Figure 1:
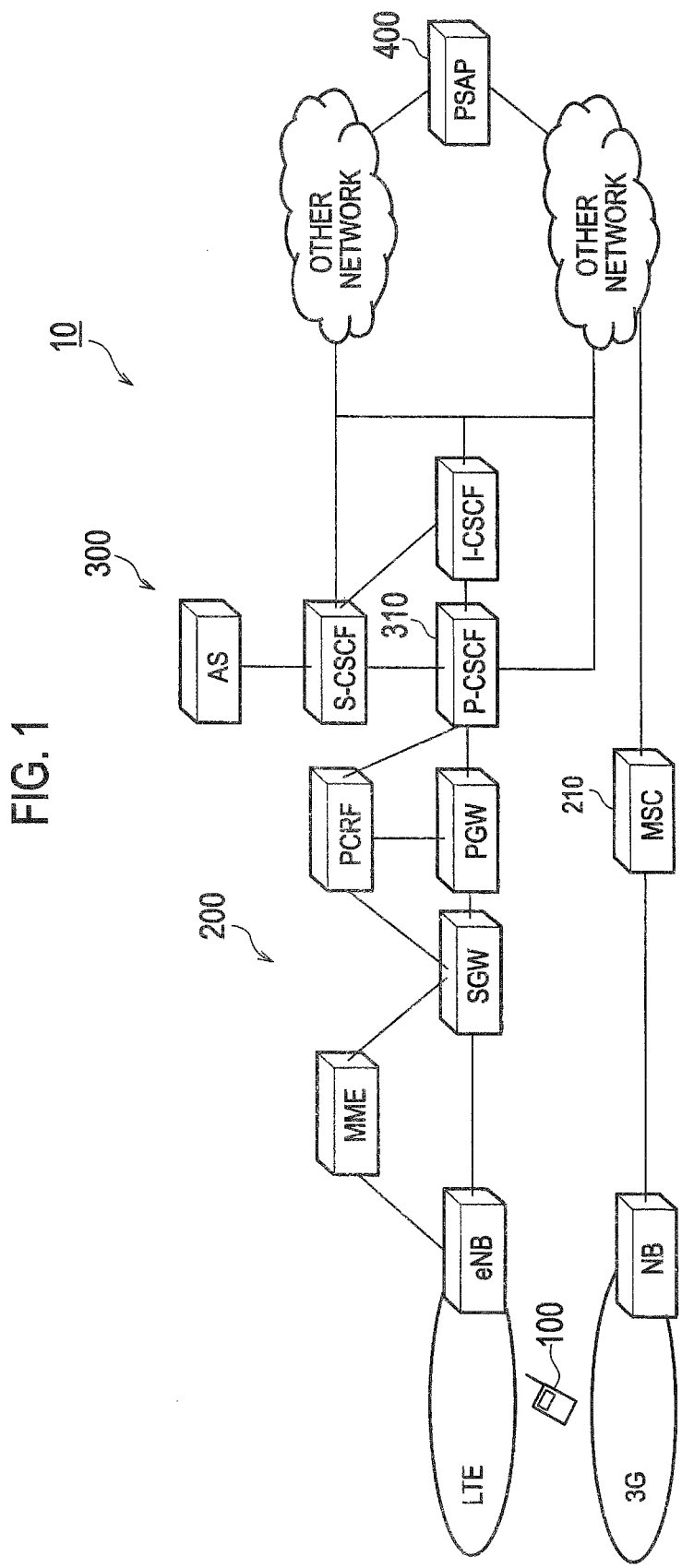
FIG. 1 is an overall schematic configuration diagram of a mobile communication system 10 according to a first embodiment of the present invention.

FIG. 1 is an overall schematic configuration diagram of a mobile communication system 10 according to a first embodiment of the present invention. As shown in FIG. 1, the mobile communication system 10 includes a mobile station 100 (hereinafter UE 100), an IP-Connectivity Access Network 200 (herein after IP-CAN 200), a Mobile services Switching Center 210 (hereinafter MSC 210), and an IP Multimedia core network Subsystem 300 (hereinafter IMS 300).

The UE 100 can establish connection to the IP-CAN 200 via a 3G-mode radio base station (NB) or an LTE-mode radio base station (eNB), and provide a communication service via the IMS 300 (an IP multimedia subsystem).

The IP-CAN 200 is an access network in compliance with the Internet Protocol (IP). Specifically, the IP-CAN 200 is a network that provides a function to transport the Session Initiation Protocol (SIP) and voice media. In this embodiment, the IP-CAN 200 corresponds to an LTE/Evolved Packet Core (EPC) network.

The IP-CAN 200 includes a Mobility Management Entity (MME), a Serving Gateway (SGW), a Packet Data Network Gateway (PGW), and a Policy and Charging Rules Function (PCRF).

The MME is switching equipment which accommodates the eNB with a mobility control function, a bearer control function, and the like. The SGW is serving packet switching equipment which accommodates a 3GPP (LTE) access system. The PGW is a packet exchange device which serves as an interface with the IMS platform and performs IP address assignment, packet transfer to the SGW, and the like. Moreover, the PGW executes QoS control, bearer setting control, and the like in conjunction with the PCRF. The PCRF executes the Quality of Service (QoS) for user data transfer and executes charging control.

The MSC 210 is circuit-switched-domain switching equipment in the 3G mode, which executes control and processing of a voice communication call.

The IMS 300 is a multimedia subsystem in compliance with the Internet Protocol, which includes a Proxy-Call Section Control Function 310 (hereinafter a P-CSCF 310), a Serving-Call Session Control Function (S-CSCF), and an Interrogating-Session Control Function (I-CSCF). Other networks (such as a fixed-line telephone network) are connected to the IMS 300. Meanwhile, a Public Safety Answering Point 400 (hereinafter a PSAP 400) is connected to the other networks.

The PSAP 400 is an emergency call answering point serving as an access point of an emergency call transmitted from the UE 100, which is in fact a switchboard that accepts the emergency call. The PSAP 400 is provided corresponding to the type of the emergency call. For example, the PSAP 400 may be a switchboard that accepts emergency calls concerning fire reports (Fire) and ambulance calls (Ambulance), a switchboard that accepts emergency calls concerning police calls (Police), and the like.

The P-CSCF, the S-CSCF, and the I-CSCF are SIP relay servers which forward SIP messages and the like. In particular, the P-CSCF is an SIP relay server located at an interface with the EPC, and undertakes roles not only in forwarding the SIP messages but also in starting the QoS control and in grasping a state of an IP-CAN bearer in conjunction with the EPC (the PCRF).

In this embodiment, the MSC 210 and the P-CSCF 310 constitute a call control device which controls connection of an emergency call initiated by the UE 100.

(2) Functional Block Configuration of Mobile Communication System

Next, a functional block configuration of the mobile communication system 10 of this embodiment will be described. To be more precise, functional block configurations of the UE 100, the MSC 210, and the P-CSCF 310 will be described.

(2. 1) UE 100

Figure 2:
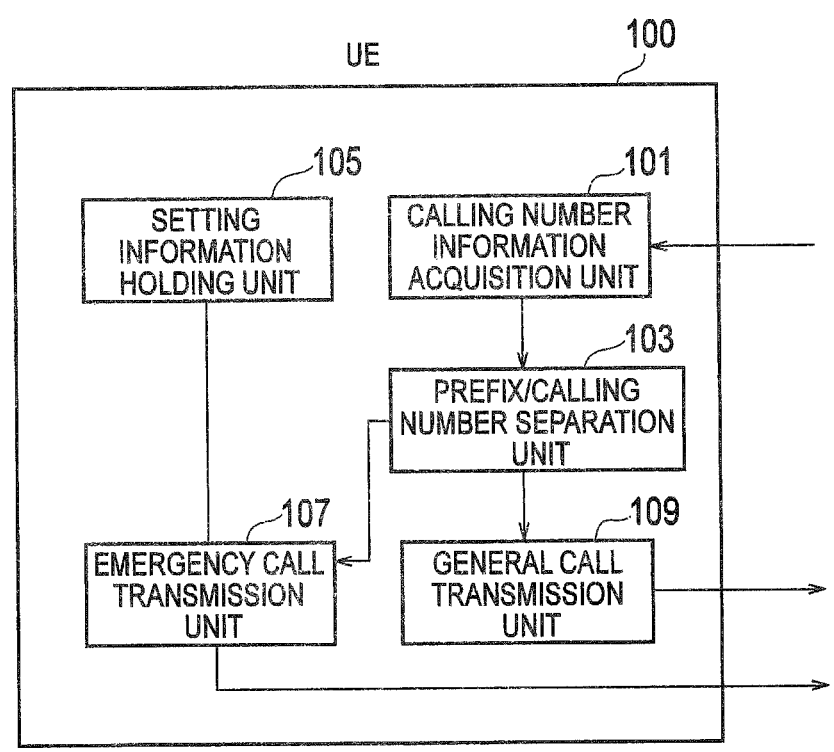
FIG. 2 is a functional block configuration diagram of UE 100 according to the first embodiment of the present invention.

FIG. 2 is a functional block diagram of the UE 100. The UE 100 includes a calling number information acquisition unit 101, a prefix/calling number separation unit 103, a setting information holding unit 105, an emergency call transmission unit 107, and a general call transmission unit 109.

The calling number information acquisition unit 101 acquires calling number information inclusive of a telephone number of a called party, which is inputted by a user of the UE 100. To be more precise, the calling number information acquisition unit 101 acquires the calling number information including: a prefix indicating how to treat the call being transmitted; and a calling number which is the telephone number of the called party. Particularly, in this embodiment, the calling number information acquisition unit 101 acquires the calling number information including: a prefix (such as 184 or 186) indicating how to treat the emergency call to the police, the fire department, or the like; and the calling number (such as 119).

The prefix is not limited in particular so long as it indicates how to treat the emergency call. Nonetheless, in this embodiment, the prefix is designed to indicate whether or not to notify the PSAP 400, which is the emergency call answering point and is the called party, of the telephone number of the calling party of the emergency call, i.e., the telephone number of the UE 100.

The prefix/calling number separation unit 103 separates the calling number information acquired by the calling number information acquisition unit 101 into the prefix and the calling number. Specifically, the prefix/calling number separation unit 103 separates the calling number information (such as 184119) into the prefix (184) and the calling number (119) based on prefix setting information held by the setting information holding unit 105. Here, instead of the prefix setting information held by the setting information holding unit 105, the prefix/calling number separation unit 103 may acquire equivalent setting information from a device constituting the IP-CAN 200 or the IMS 300 at the time of transmitting a call.

The setting information holding unit 105 holds the prefix setting information. As mentioned above, in this embodiment, the prefix in this embodiment is designed to indicate whether or not to notify the PSAP 400, which is the emergency call answering point and is the called party, of the telephone number of the calling party of the emergency call, i.e., the telephone number of the UE 100.

FIGS. 8(a) and 8(b) show examples of the prefix setting information held by the setting information holding unit 105. The setting information shown in FIG. 8(a) includes calling number information (number) elements, prefix elements, and emergency call number elements. When this setting information is used, the prefix/calling number separation unit 103 determines whether or not the whole calling number information matches the setting information, and separates the calling number information into the prefix and the emergency call number if the whole calling number information matches the setting information.

On the other hand, the setting information shown in FIG. 8(b) consists of prefix elements. When this setting information is used, the prefix/calling number separation unit 103 determines, based on the number of digits (three digits) of the prefix, whether or not information represented by first three digits in the calling number information matches the setting information. If the information matches the setting information, the prefix/calling number separation unit 103 separates the remaining digits of the number, other than the first three digits, as the emergency call number.

The emergency call transmission unit 107 executes processing to transmit the emergency call initiated by the UE 100. Specifically, the emergency call transmission unit 107 transmits the emergency call by using an Emergency Setup message (an emergency call transmission signal) defined by 3GPP.

To be more precise, based on the calling number separated by the prefix/calling number separation unit 103, the emergency call transmission unit 107 selects an Emergency Category linked with the calling number. The emergency call transmission unit 107 sends the MSC 210 the emergency call in the form of the Emergency Setup, which includes the prefix separated by the prefix/calling number separation unit 103, and the selected Emergency Category (an emergency call type). Here, the prefix to be included in the Emergency Setup may be the prefix itself (such as 184) or information indicating the meaning of the prefix (such as blocking notification of the telephone number of the calling party).

The general call transmission unit 109 executes processing to transmit general calls other than the emergency call initiated by the UE 100. In particular, the general call transmission unit 109 executes transmission processing of an emergency call, whose prefix is unidentifiable by the prefix/calling number separation unit 103, as in the case of a general call.

(2. 2) MSC 210

FIG. 3 is a functional block diagram of the MSC 210. The MSC 210 includes an emergency call reception unit 211, a prefix/call type identification unit 213, and an emergency call control unit 215.

The emergency call reception unit 211 receives the emergency call in the form of the Emergency Setup from the UE 100. The emergency call reception unit 211 notifies the prefix/call type identification unit 213 of the information elements included in the received Emergency Setup.

The prefix/call type identification unit 213 identifies the prefix (such as 184) and the Emergency Category (such as fire or ambulance) included in the Emergency Setup notified of by the emergency call reception unit 211.

Based on the prefix identified by the prefix/call type identification unit 213, the emergency call control unit 215 determines how to treat the emergency call received from the UE 100. Meanwhile, based on the Emergency Category identified by the prefix/call type identification unit 213, the emergency call control unit 215 connects the emergency call to the PSAP 400 corresponding to the Emergency Category.

In particular, when the prefix indicates a refusal (in the case of 184) to notify the PSAP 400 of the telephone number of the calling party (the telephone number of the UE 100), the emergency call control unit 215 connects the emergency call to the PSAP 400 without notifying the PSAP 400 of the telephone number of the calling party.

(2. 3) P-CSCF 310

FIG. 4 is a functional block diagram of the P-CSCF 310. The P-CSCF 310 includes an emergency call reception unit 311, a prefix/call type identification unit 313, and an emergency call control unit 315.

The above-described MSC 210 executes the processing of the emergency call via the circuit-switched domain when the UE 100 attaches to a 3G-mode radio access network. On the other hand, the P-CSCF 310 executes processing of the emergency call in accordance with the VoLTE when the UE 100 attaches to an LTE-mode radio access network.

The emergency call reception unit 311, the prefix/call type identification unit 313, and the emergency call control unit 315 correspond to the emergency call reception unit 211, the prefix/call type identification unit 213, and the emergency call control unit 215 of the MSC 210, respectively. Meanwhile, the processing of the emergency call in accordance with the VoLTE is similar to the processing of the emergency call via the circuit-switched domain except that the former processing uses an INVITE message in accordance with the Session Initial Protocol (SIP) instead of the Emergency Setup message. Accordingly, detailed description of the functional blocks therein will be omitted.

(3) Operations of Mobile Communication System

Next, operations of the mobile communication system 10 will be described. To be more precise, an emergency call transmission sequence and an operation flow of the UE 100 will be described.

(3. 1) Emergency Call Transmission Sequence (3. 1. 1) In 3G Mode

Figure 5:
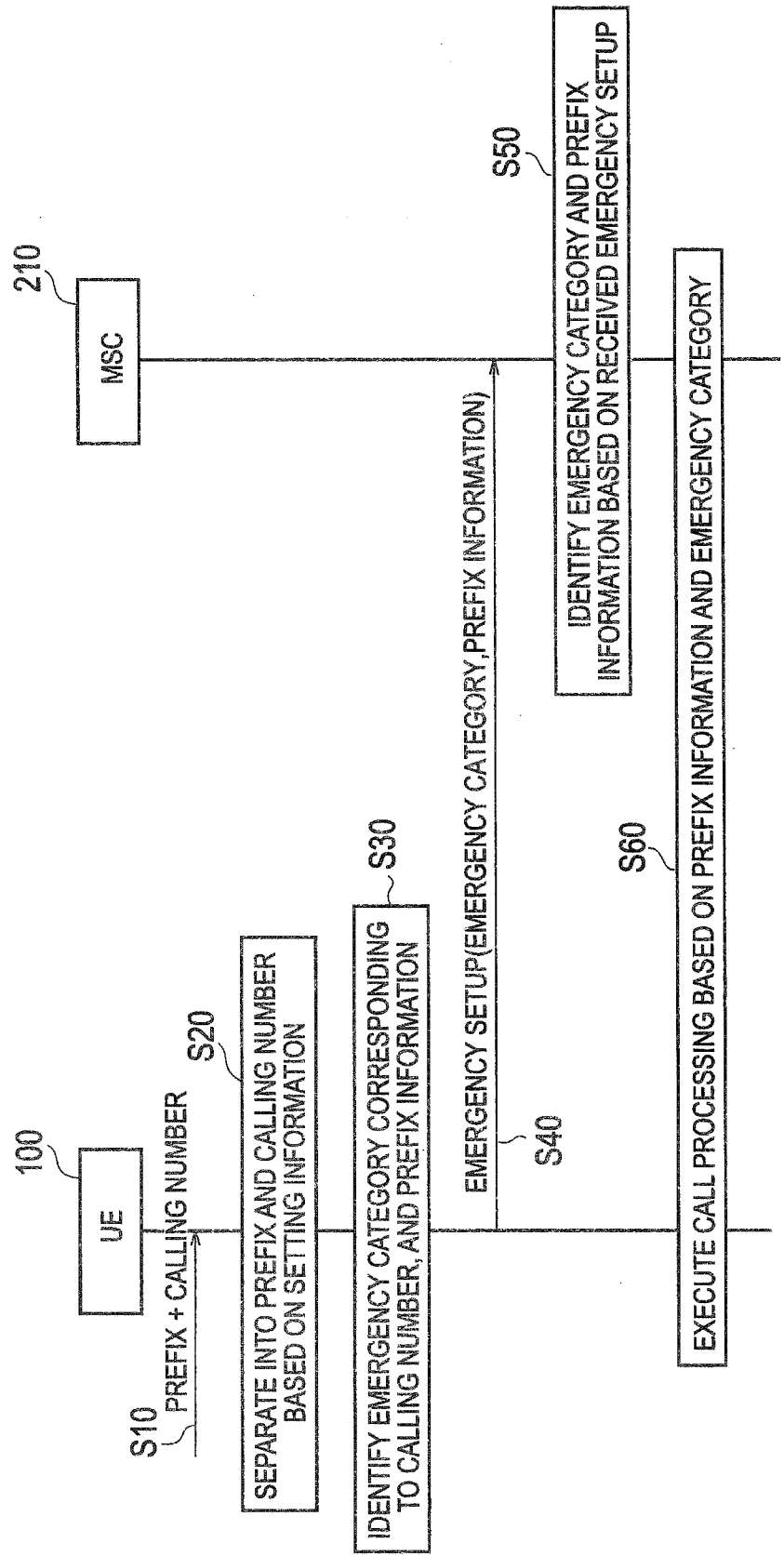
FIG. 5 is a diagram showing an emergency call transmission sequence in a 3G mode (circuit-switched domain) according to the first embodiment of the present invention.

FIG. 5 shows an emergency call transmission sequence in the 3G mode (the circuit-switched domain). As shown in FIG. 5, the user of the UE 100 inputs the calling number information to the UE 100 (S10). Here, the calling number information includes the prefix (such as 184 or 186) and the calling number (such as 119).

The UE 100 separates the inputted calling number information into the prefix and the calling number based on the prefix setting information (see FIGS. 8(a) and 8(b)) (S20). The UE 100 identifies the Emergency Category linked with the separated calling number, and the information (prefix information) on the separated prefix (S30). Here, as described previously, the prefix information may be the prefix itself (such as 184) or the information indicating the meaning of the prefix (such as blocking notification of the telephone number of the calling party).

The UE 100 sends the MSC 210 the Emergency Setup including the Emergency Category and the prefix information thus identified (S40). Based on the received Emergency Setup, the MSC 210 identifies the Emergency Category and the prefix information included in the Emergency Setup (S50).

Based on the Emergency Category and the prefix information thus identified, the MSC 210 executes the processing of the emergency call in conjunction with the UE 100 (S60).

(3. 1. 2) In LTE Mode

Figure 6:
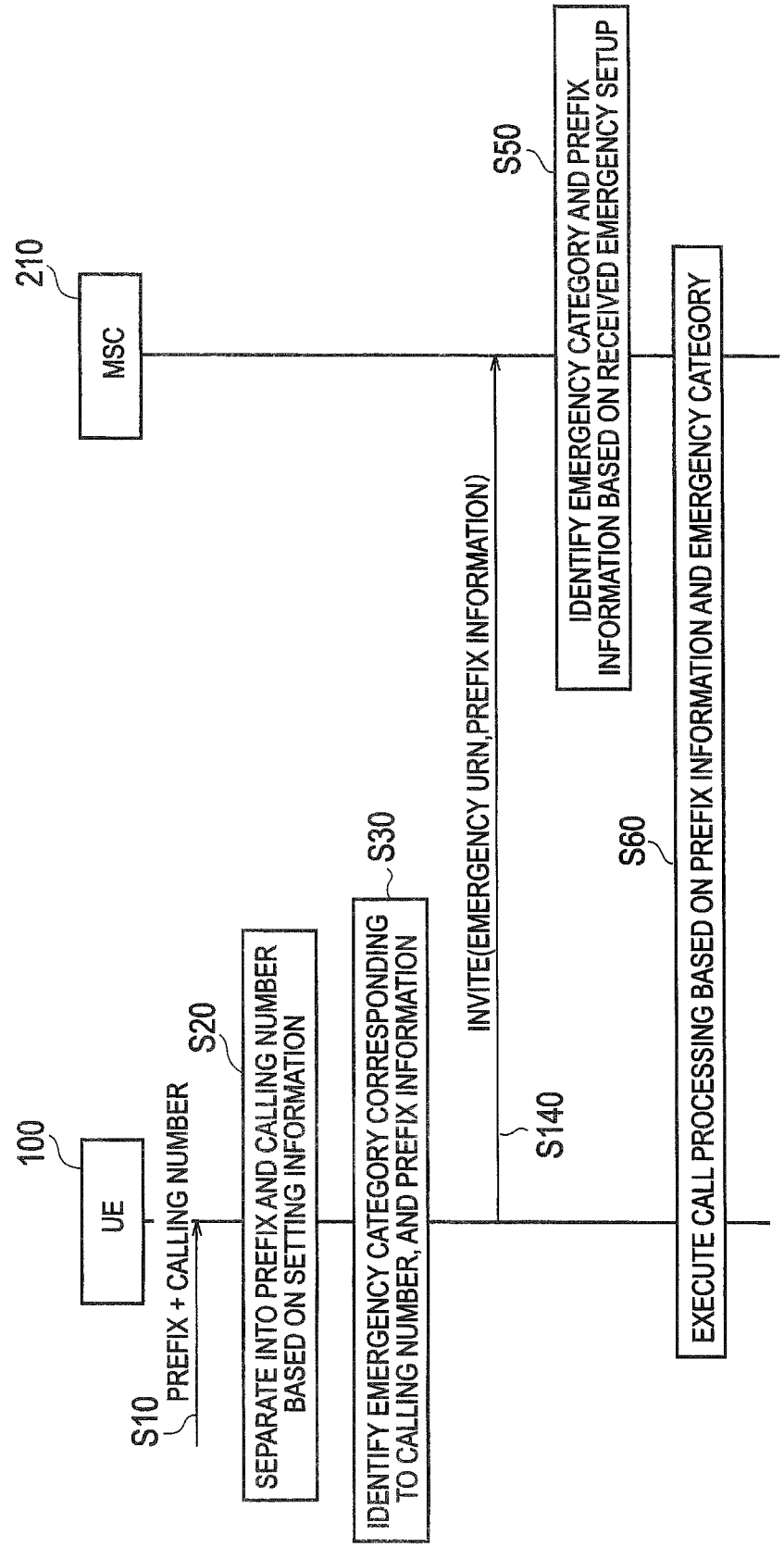
FIG. 6 is a diagram showing an emergency call transmission sequence in an LTE mode (VoLTE) according to the first embodiment of the present invention.

FIG. 6 shows an emergency call transmission sequence in the LTE mode (the VoLTE). The emergency call transmission sequence in the LTE mode (the VoLTE) is substantially the same as that in the 3G mode described above.

Here, a main difference from the sequence in the 3G mode is in that the INVITE message is used instead of the Emergency Setup message. The UE 100 sends the MSC 210 the INVITE which includes an Emergency URN and the prefix information (S140). The Emergency URN corresponds to the Emergency Category and is capable of indicating the type of the emergency call.

The remaining part of this sequence is similar to the sequence in the 3G mode. Hence, description thereof will be omitted.

(3. 2) Operation Flow of UE 100

Figure 7:
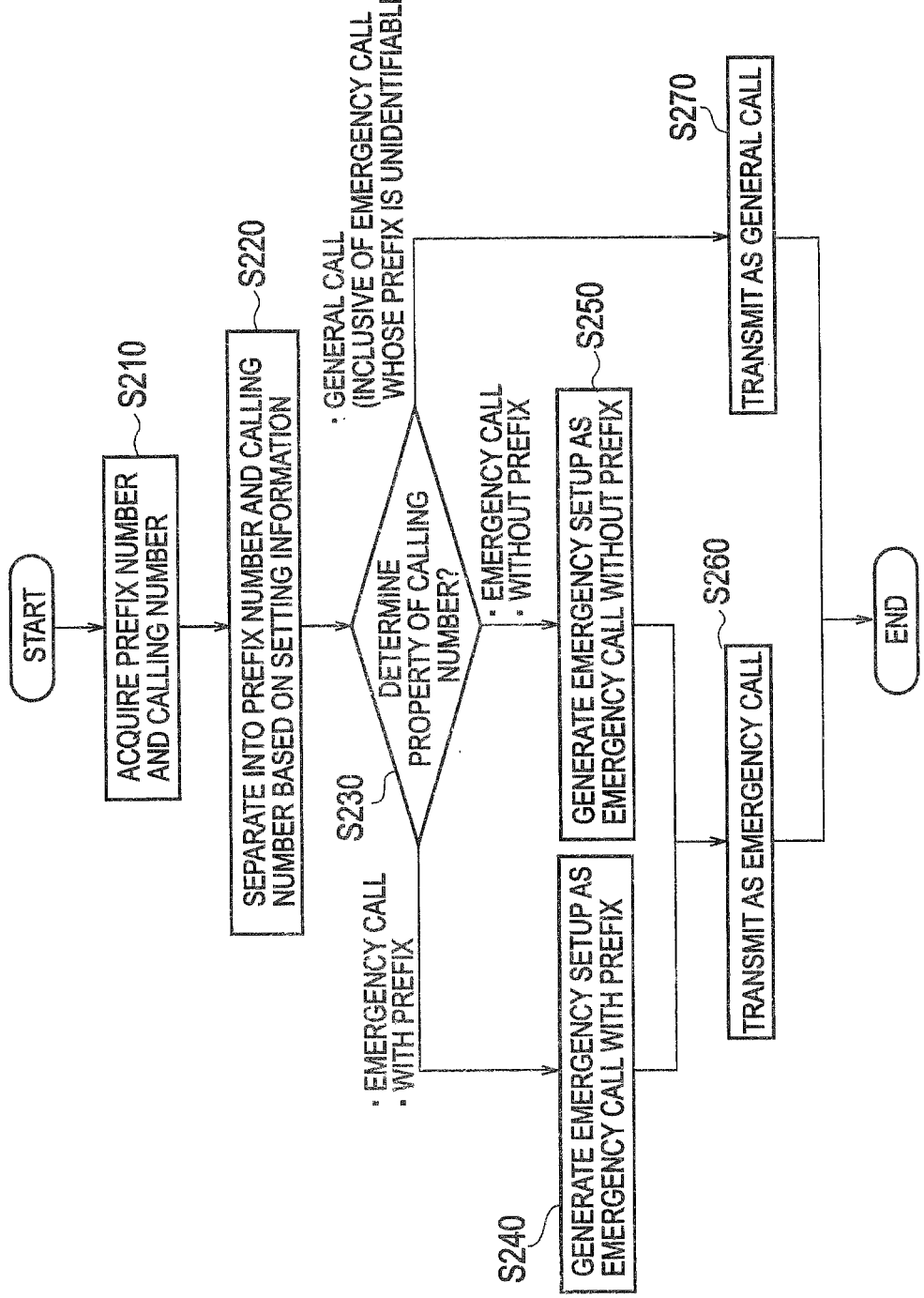
FIG. 7 is a chart showing an operation flow of the UE 100 according to the first embodiment of the present invention.

FIG. 7 shows an operation flow of the UE 100. As shown in FIG. 7, the UE 100 acquires the calling number information including the prefix and the calling number inputted by the user (S210), and separates the acquired calling number information into the prefix and the calling number based on the prefix setting information (see FIGS. 8(*a*) and 8(*b*)) (S220).

The UE 100 determines a property of the calling number based on the prefix and the calling number thus separated (S230).

When the property of the calling number represents the emergency call provided with the prefix, the UE 100 generates the Emergency Setup for the emergency call with the prefix (S240). On the other hand, when the property of the calling number represents the emergency call without the prefix, the UE 100 generates the Emergency Setup for the emergency call without the prefix (S250). The UE 100 transmits the generated Emergency Setup to the MSC 210, and thus executes the transmission as the emergency call (S260).

On the other hand, in the case of the general call other than the emergency call, the UE 100 transmits the call as the general call without using the Emergency Setup (S270). The general call other than the emergency call also includes the emergency call whose prefix is unidentifiable. Here, in the case of the LTE mode, the INVITE is used instead of the Emergency Setup.

(4) Operation and Effects

According to the mobile communication system 10, the UE 100 separates the acquired calling number information into the prefix and the calling number, and sends the MSC 210 (or the P-CSCF 310) the Emergency Setup (or the INVITE) which includes the prefix and the Emergency Category linked with the calling number.

Based on the prefix included in the Emergency Setup (or the INVITE), the MSC 210 (or the P-CSCF 310) determines how to treat the emergency call (such as to block notification of the telephone number of the calling party), and connects the emergency call to the PSAP 400 corresponding to the Emergency Category.

For this reason, even when the prefix is added to the calling number of the emergency call, it is possible to treat such a call as the emergency call instead of the general call, and as a consequence to allow this emergency call to break through access control or apply priority control to the emergency call, as in the case of a normal emergency call without the addition of the prefix thereto.

In this embodiment, the UE 100 separates the calling number information into the prefix and the calling number based on the prefix setting information held by the setting information holding unit 105. For this reason, the UE 100 can perform the processing based on the prefix setting information that is preset to the UE 100. Accordingly, the UE 100 can perform the separation promptly and reliably.

In this embodiment, when the prefix (184) indicates the refusal to notify the PSAP 400 of the telephone number of the calling party, the MSC 210 (and the P-CSCF 310) connects the emergency call to the PSAP 400 without notifying the PSAP 400 of the telephone number of the calling party. In this way, this emergency call can also be processed in compliance with a guideline for personal information protection.

Second Embodiment

Next, a second embodiment of the present invention will be described. In this embodiment, information to be included in the Emergency Setup (INVITE) message is different from that in the above-described first embodiment. In the above-described first embodiment, the Emergency Setup includes the prefix and the Emergency Category. On the other hand, instead of the Emergency Category, the Emergency Setup of this embodiment includes the calling number itself, which is the telephone number of the calling party. In the following, features different from those in the above-described first embodiment will be mainly explained.

(1) Functional Block Configuration of Mobile Communication System

Next, a functional block configuration of a mobile communication system 10 of this embodiment will be described. To be more precise, functional block configurations of UE 100, an MSC 210, and a P-CSCF 310 will be described.

(1. 1) UE 100

Figure 9:
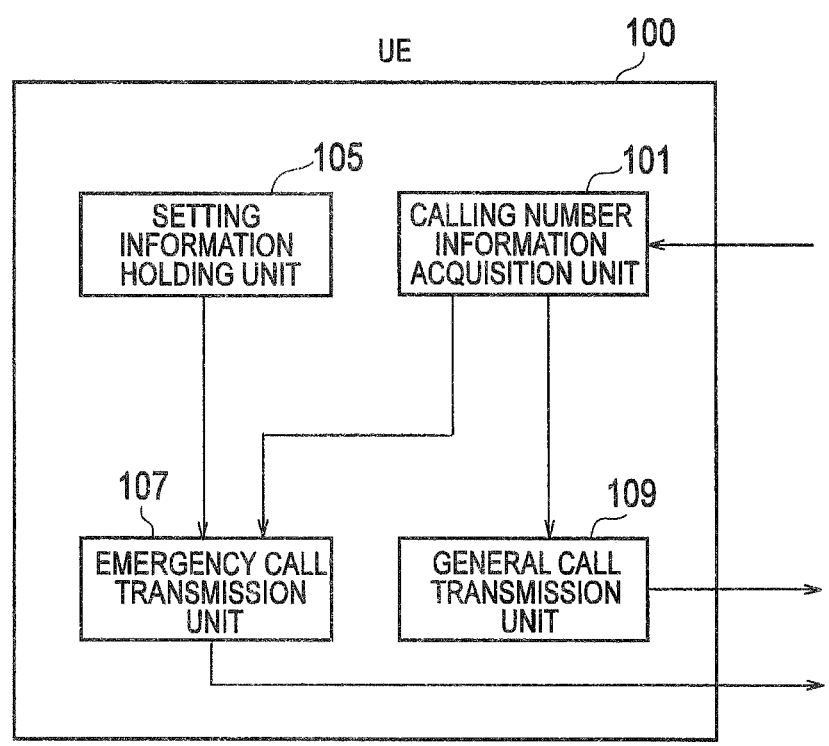
FIG. 9 is a functional block configuration diagram of UE 100 according to a second embodiment of the present invention.

FIG. 9 is a functional block diagram of the UE 100 of this embodiment. As shown in FIG. 9, the UE 100 of this embodiment does not include the prefix/calling number separation unit 103.

For this reason, the setting information holding unit 105 holds setting information (such as 184110=Police), in which the calling number information (such as 184110) is linked with the called party (the PSAP) of the emergency call, instead of the setting information shown in FIGS. 8(*a*) and 8(*b*).

The emergency call transmission unit 107 sends the MSC 210 the emergency call in the form of the Emergency Setup, which includes the prefix and the calling number acquired by the calling number information acquisition unit 101 (in the 3G mode) Alternatively, the emergency call transmission unit 107 sends the P-CSCF 310 the emergency call in the form of the INVITE, which includes the prefix and the calling number acquired by the calling number information acquisition unit 101 (in the LTE mode).

(1. 2) MSC 210

Figure 10:
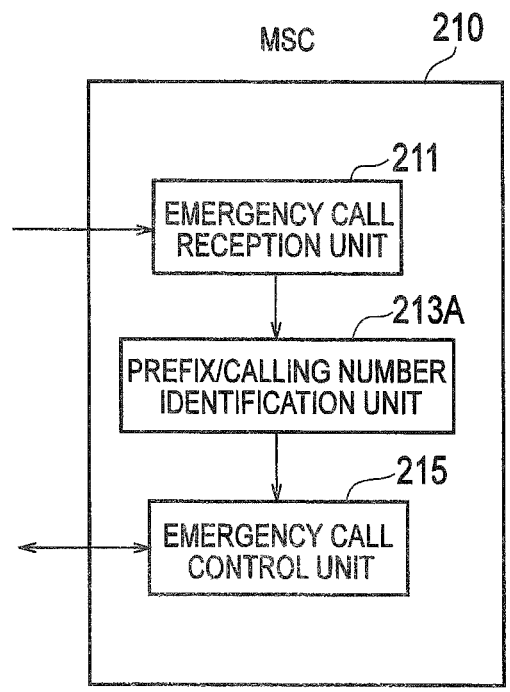
FIG. 10 is a functional block configuration diagram of an MSC 210 according to the second embodiment of the present invention.

FIG. 10 is a functional block diagram of the MSC 210 of this embodiment. The MSC 210 of this embodiment includes a prefix/calling number identification unit 213A instead of the prefix/call type identification unit 213. The prefix/calling number identification unit 213A identifies the prefix and the calling number included in the Emergency Setup (the emergency call transmission signal).

Based on the prefix identified by the prefix/calling number identification unit 213A, the emergency call control unit 215 determines how to treat the emergency call. Meanwhile, based on the calling number identified by the prefix/calling number identification unit 213A, the emergency call control unit 215 connects the emergency call to the PSAP 400 corresponding to the calling number.

(1. 3) P-CSCF 310

Figure 11:
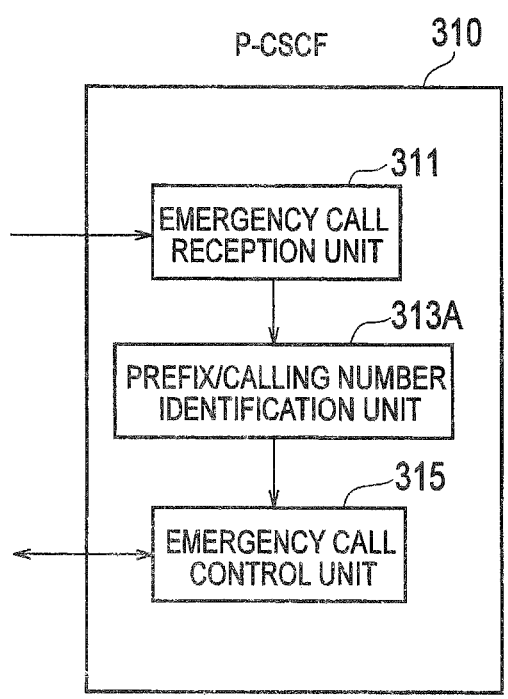
FIG. 11 is a functional block configuration diagram of a P-CSCF 310 according to the second embodiment of the present invention.

FIG. 11 is a functional block diagram of the P-CSCF 310 of this embodiment. The P-CSCF 310 of this embodiment includes a prefix/calling number identification unit 313A instead of the prefix/call type identification unit 313. The prefix/calling number identification unit 313A identifies the prefix and the calling number included in the INVITE (the emergency call transmission signal).

Moreover, based on the prefix identified by the prefix/calling number identification unit 313A, the emergency call control unit 315 determines how to treat the emergency call. Meanwhile, based on the calling number identified by the prefix/calling number identification unit 313A, the emergency call control unit 315 connects the emergency call to the PSAP 400 corresponding to the calling number.

(2) Operations of Mobile Communication System

Next, operations of the mobile communication system 10 of this embodiment will be described. To be more precise, an emergency call transmission sequence will be described. In the following, features different from the emergency call transmission sequence according to the above-described first embodiment (see FIG. 5 and FIG. 6) will be mainly explained.

(2. 1) In 3G Mode

Figure 12:
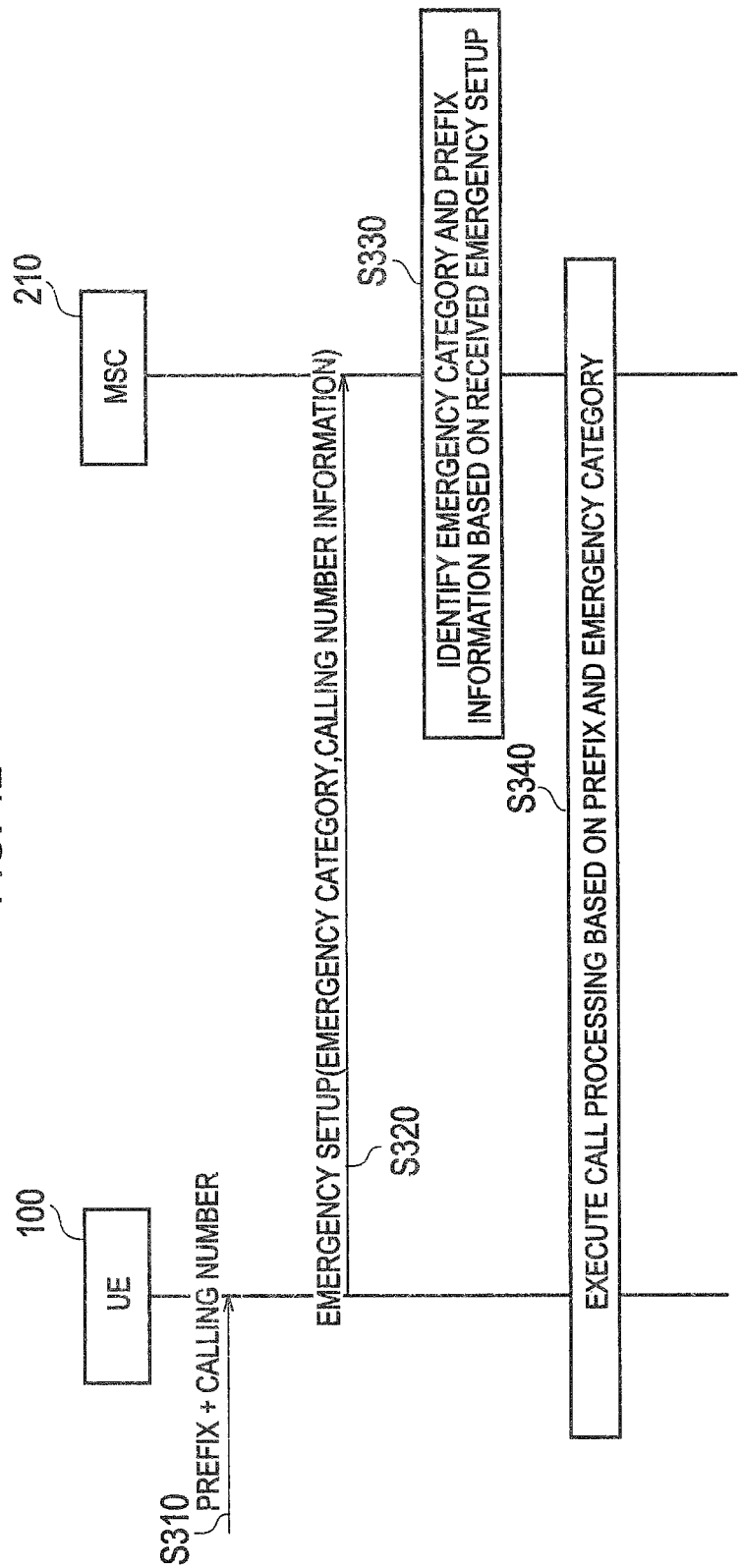
FIG. 12 is a diagram showing an emergency call transmission sequence in the 3G mode (circuit-switched domain) according to the second embodiment of the present invention.

FIG. 12 shows an emergency call transmission sequence in the 3G mode (the circuit-switched domain). As shown in FIG. 12, the UE 100 sends the MSC 210 the Emergency Setup (S320) Here, the Emergency Setup includes: the Emergency Category (fire, ambulance) identified based on setting information, in which the calling number information (for example, 184119) is linked with the called party (the PSAP) of the emergency call; and the calling number information (such as 184119) formed from the prefix and the calling number.

Based on the received Emergency Setup, the MSC 210 identifies the Emergency Category and the prefix information included in the Emergency Setup (S330), and executes the processing of the emergency call in conjunction with the UE 100 based on the Emergency Category and the prefix information thus identified (S340).

(2. 2) In LTE Mode

Figure 13:
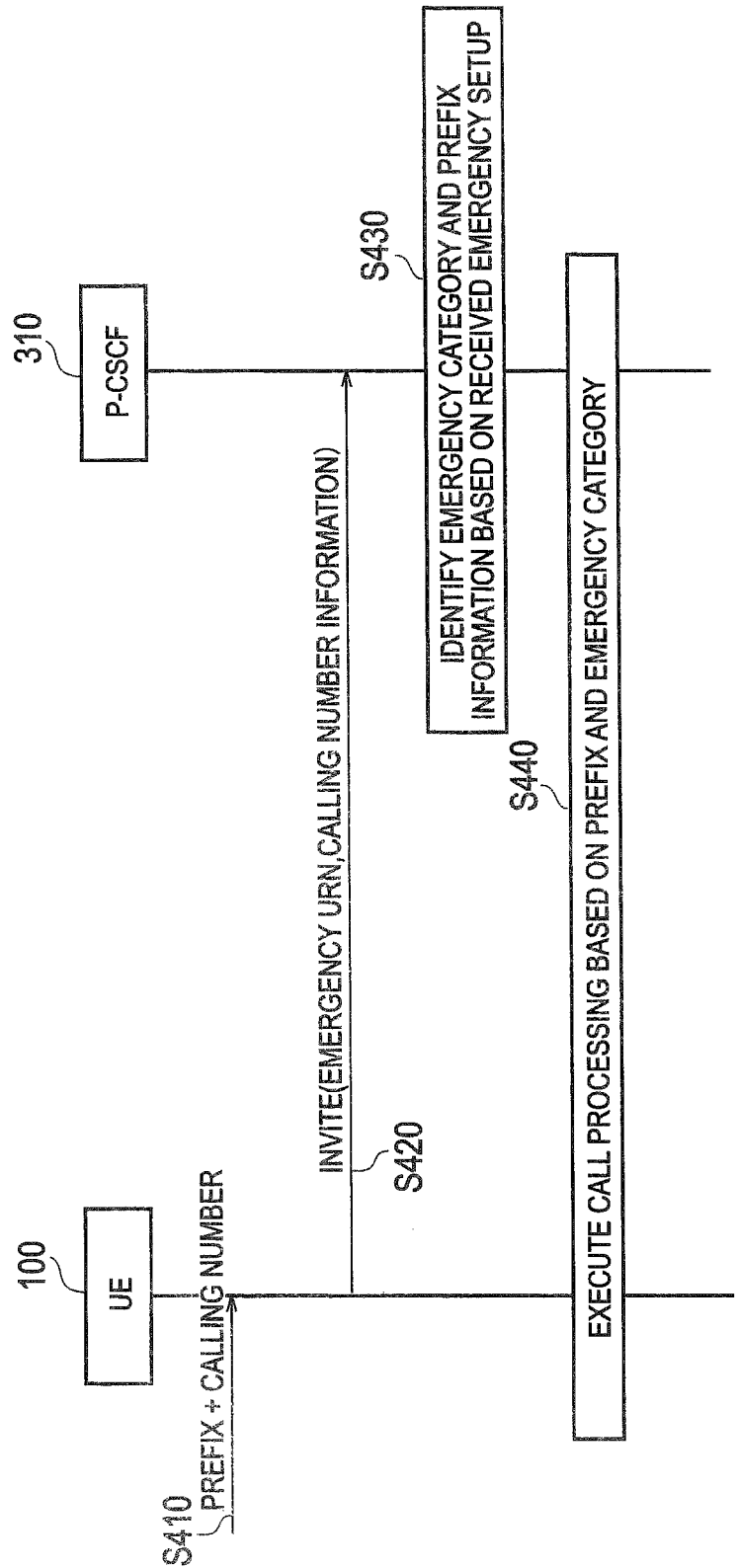
FIG. 13 is a diagram showing an emergency call transmission sequence in the LTE mode (VoLTE) according to the second embodiment of the present invention.

FIG. 13 shows an emergency call transmission sequence in the LTE mode (the VoLTE). The emergency call transmission sequence in the LTE mode (the VoLTE) is substantially the same as that in the 3G mode described above.

Here, a main difference from the sequence in the 3G mode is in that the INVITE message is used instead of the Emergency Setup message. Specifically, the UE 100 sends the MSC 210 the INVITE which includes: the Emergency URN; and the calling number information formed from the prefix and the calling number (S240). The subsequent part of the sequence is the same as that to be executed by the MSC 210.

(3) Operation and Effects

As with the first embodiment, according to the mobile communication system 10 of this embodiment, even when the prefix is added to the calling number of the emergency call, it is possible to treat such a call as the emergency call instead of the general call, and as a consequence to allow this emergency call to break through access control and apply priority control to the emergency call, as in the case of a normal emergency call without the addition of the prefix thereto.

Other Embodiments

As described above, the details of the present invention have been disclosed by using the first and the second embodiments of the present invention. However, it should not be understood that the description and drawings which constitute part of this disclosure limit the present invention. From this disclosure, various alternative embodiments will be easily found by those skilled in the art.

For example, the above-mentioned first embodiment of the present invention has described the example of using the prefix indicating whether or not to notify the PSAP 400, which is the emergency call answering point and is the called party, of the telephone number of the calling party of the emergency call, i.e., the telephone number of the UE 100. However, the prefix is not limited only to the indication as to whether or not to notify of the telephone number of the calling party as long as the prefix is designed to indicate how to treat the emergency call. For instance, the present invention is also applicable to: a prefix (186) which indicates definite notification of the telephone number of the calling party; a subaddress such as #xxx to be set to follow a Prefix telephone number like #31# in an Android terminal and the like; and a Postfix. Meanwhile, the present invention is also applicable to an emergency call using a specific number that is available for a specific user, such as the Government Emergency Telecommunications Service (GETS) in the United States, though such a call may not be regarded as an emergency call in general.

Here, the present invention may be described as follows. In summary, a first aspect of the present invention provides a mobile communication system 10 (a mobile communication system) including: UE 100 (a mobile station); and a call control device (for example, an MSC 210) configured to control connection of an emergency call initiated by the mobile station. The mobile station includes: a calling number information acquisition unit 101 (a calling number information acquisition unit) configured to acquire calling number information including a prefix indicating how to treat the emergency call, and a calling number being a telephone number of a called party; a prefix/calling number separation unit 103 (a prefix/calling number separation unit) configured to separate the calling number information acquired by the calling number information acquisition unit into the prefix and the calling number; and an emergency call transmission unit 107 (an emergency call transmission unit) configured to send the call control device the emergency call in the form of an emergency call transmission signal including the prefix separated by the prefix/calling number separation unit, and an emergency call type linked with the calling number. The call control device includes: an emergency call reception unit 211 (an emergency call reception unit) configured to receive from the mobile station the emergency call in the form of the emergency call transmission signal; a prefix/call type identification unit 213 (a prefix/call type identification unit) configured to identify the prefix and the emergency call type included in the emergency call transmission signal; and an emergency call control unit 215 (an emergency call control unit) configured to determine how to treat the emergency call based on the prefix identified by the prefix/call type identification unit, and to connect the emergency call to an emergency call answering point corresponding to the emergency call type based on the emergency call type identified by the prefix/call type identification unit.

In the first aspect of the present invention, a setting information holding unit configured to hold setting information on the prefix is included. The prefix/calling number separation unit may separate the calling number information into the prefix and the calling number based on the setting information on the prefix held by the setting information holding unit.

In the first aspect of the present invention, the prefix indicates whether or not to notify the emergency call answering point of a telephone number of a calling party of the emergency call. When the prefix indicates a refusal to notify the emergency call answering point of the telephone number of the calling party, the emergency call control unit may connect the emergency call to the emergency call answering point without notifying the emergency call answering point of the telephone number of the calling party.

In summary, a second aspect of the present invention provides a mobile station configured to initiate an emergency call, including: a calling number information acquisition unit configured to acquire calling number information including a prefix indicating how to treat the emergency call, and a calling number being a telephone number of a called party; a prefix/calling number separation unit configured to separate the calling number information acquired by the calling number information acquisition unit into the prefix and the calling number; and an emergency call transmission unit configured to send a call control device configured to control connection of the emergency call. The emergency call in the form of an emergency call transmission signal includes the prefix separated by the prefix/calling number separation unit, and an emergency call type linked with the calling number.

In summary, a third aspect of the present invention provides a call control device configured to control connection of an emergency call initiated by a mobile station, including: an emergency call reception unit configured to receive from the mobile station the emergency call in the form of an emergency call transmission signal including a prefix indicating how to treat the emergency call, and an emergency call type linked with a calling number being a telephone number of a called party; a prefix/call type identification unit configured to identify the prefix and the emergency call type included in the emergency call transmission signal; and an emergency call control unit configured to determine how to treat the emergency call based on the prefix identified by the prefix/call type identification unit, and to connect the emergency call to an emergency call answering point corresponding to the emergency call type based on the emergency call type identified by the prefix/call type identification unit.

In summary, a fourth aspect of the present invention provides a mobile communication method implemented by a mobile station and a call control device configured to control connection of an emergency call initiated by the mobile station. The method includes the steps of: causing the mobile station to acquire calling number information including a prefix indicating how to treat the emergency call, and a calling number being a telephone number of a called party; causing the mobile station to separate the acquired calling number information into the prefix and the calling number; causing the mobile station to send the call control device the emergency call in the form of an emergency call transmission signal including the separated prefix, and an emergency call type linked with the calling number; causing the call control device to receive from the mobile station the emergency call in the form of the emergency call transmission signal; causing the call control device to identify the prefix and the emergency call type included in the emergency call transmission signal; and causing the call control device to determine how to treat the emergency call based on the identified prefix, and to connect the emergency call to an emergency call answering point corresponding to the emergency call type based on the identified emergency call type.

In summary, a fifth aspect of the present invention provides a mobile communication system including: a mobile station; and a call control device (for example, an MSC 210) configured to control connection of an emergency call initiated by the mobile station. The mobile station includes: a calling number information acquisition unit configured to acquire calling number information including a prefix indicating how to treat the emergency call, and a calling number being a telephone number of a called party; and an emergency call transmission unit configured to send the call control device the emergency call in the form of an emergency call transmission signal including the prefix and the calling number acquired by the calling number information acquisition unit. The call control device includes: an emergency call reception unit configured to receive from the mobile station the emergency call in the form of the emergency call transmission signal; a prefix/calling number identification unit 213A (a prefix/calling number identification unit) configured to identify the prefix and the calling number included in the emergency call transmission signal; and an emergency call control unit configured to determine how to treat the emergency call based on the prefix identified by the prefix/calling number identification unit, and to connect the emergency call to an emergency call answering point corresponding to the calling number based on the calling number identified by the prefix/calling number identification unit.

In summary, a sixth aspect of the present invention provides a mobile communication method implemented by a mobile station and a call control device configured to control connection of an emergency call initiated by the mobile station. The method includes the steps of: causing the mobile station to acquire calling number information including a prefix indicating how to treat the emergency call, and a calling number being a telephone number of a called party; causing the mobile station to send the call control device the emergency call in the form of an emergency call transmission signal including the acquired prefix, and the acquired calling number; causing the call control device to receive from the mobile station the emergency call in the form of the emergency call transmission signal; causing the call control device to identify the prefix and the calling number included in the emergency call transmission signal; and causing the call control device to determine how to treat the emergency call based on the identified prefix, and to connect the emergency call to an emergency call answering point corresponding to the calling number based on the identified calling number.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2013-192643 (filed on Sep. 18, 2013) is incorporated herein by reference in the present specification.

INDUSTRIAL APPLICABILITY

According to the features of the present invention, it is possible to provide a mobile communication system, a mobile station, a call control device, and a mobile communication method that are capable of allowing an emergency call, even to which a prefix indicating how to treat the emergency call is added, to break through access control and applying priority control to the emergency call, as in the case of a normal emergency call without the addition of the prefix thereto.

EXPLANATION OF THE REFERENCE NUMERALS

10 mobile communication system
100 UE 101 calling number information acquisition unit
103 prefix/calling number separation unit
105 setting information holding unit
107 emergency call transmission unit
109 general call transmission unit
200 IP-CAN
210 MSC
211 emergency call reception unit
213 prefix/call type identification unit
213A prefix/calling number identification unit
215 emergency call control unit
300 IMS
310 P-CSCF
311 emergency call reception unit
313 prefix/call type identification unit
313A prefix/calling number identification unit
315 emergency call control unit
400 PSAP

The invention claimed is:

1. A mobile communication system comprising:
a mobile station; and
a call control device configured to control connection of an emergency call initiated by the mobile station, wherein
the mobile station includes
a calling number information acquisition unit configured to acquire calling number information including
a prefix indicating how to treat the emergency call, and
a calling number being a telephone number of a called party,
a prefix/calling number separation unit configured to separate the calling number information acquired by the calling number information acquisition unit into the prefix and the calling number, and
an emergency call transmission unit configured to send the call control device the emergency call in the form of an emergency call transmission signal including the prefix separated by the prefix/calling number separation unit, and an emergency call type linked with the calling number, and
the call control device includes
an emergency call reception unit configured to receive from the mobile station the emergency call in the form of the emergency call transmission signal,
a prefix/call type identification unit configured to identify the prefix and the emergency call type included in the emergency call transmission signal, and
an emergency call control unit configured to determine how to treat the emergency call based on the prefix identified by the prefix/call type identification unit, and to connect the emergency call to an emergency call answering point corresponding to the emergency call type based on the emergency call type identified by the prefix/call type identification unit.

2. The mobile communication system according to claim 1, comprising a setting information holding unit configured to hold setting information on the prefix, wherein
the prefix/calling number separation unit separates the calling number information into the prefix and the calling number based on the setting information on the prefix held by the setting information holding unit.

3. The mobile communication system according to claim 1, wherein
the prefix indicates whether or not to notify the emergency call answering point of a telephone number of a calling party of the emergency call, and
when the prefix indicates a refusal to notify the emergency call answering point of the telephone number of the calling party, the emergency call control unit connects the emergency call to the emergency call answering point without notifying the emergency call answering point of the telephone number of the calling party.

4. A mobile station configured to initiate an emergency call, comprising:
a calling number information acquisition unit configured to acquire calling number information including
a prefix indicating how to treat the emergency call, and
a calling number being a telephone number of a called party;
a prefix/calling number separation unit configured to separate the calling number information acquired by the calling number information acquisition unit into the prefix and the calling number; and
an emergency call transmission unit configured to send a call control device configured to control connection of the emergency call, the emergency call in the form of an emergency call transmission signal including
the prefix separated by the prefix/calling number separation unit, and
an emergency call type linked with the calling number.

5. A call control device configured to control connection of an emergency call initiated by a mobile station, comprising:
an emergency call reception unit configured to receive from the mobile station the emergency call in the form of an emergency call transmission signal including
a prefix indicating how to treat the emergency call, and
an emergency call type linked with a calling number being a telephone number of a called party;
a prefix/call type identification unit configured to identify the prefix and the emergency call type included in the emergency call transmission signal; and
an emergency call control unit configured to determine how to treat the emergency call based on the prefix identified by the prefix/call type identification unit, and to connect the emergency call to an emergency call answering point corresponding to the emergency call type based on the emergency call type identified by the prefix/call type identification unit.

6. A mobile communication method implemented by a mobile station and a call control device configured to control connection of an emergency call initiated by the mobile station, the method comprising the steps of:
causing the mobile station to acquire calling number information including
a prefix indicating how to treat the emergency call, and
a calling number being a telephone number of a called party;
causing the mobile station to separate the acquired calling number information into the prefix and the calling number;
causing the mobile station to send the call control device the emergency call in the form of an emergency call transmission signal including
the separated prefix, and
an emergency call type linked with the calling number;
causing the call control device to receive from the mobile station the emergency call in the form of the emergency call transmission signal;
causing the call control device to identify the prefix and the emergency call type included in the emergency call transmission signal; and causing the call control device to determine how to treat the emergency call based on the identified prefix, and to connect the emergency call to an emergency call answering point corresponding to the emergency call type based on the identified emergency call type.

7. A mobile communication system comprising:
a mobile station; and
a call control device configured to control connection of an emergency call initiated by the mobile station, wherein
the mobile station includes
  a calling number information acquisition unit configured to acquire calling number information including
    a prefix indicating how to treat the emergency call, and
    a calling number being a telephone number of a called party, and
  an emergency call transmission unit configured to send the call control device the emergency call in the form of an emergency call transmission signal including the prefix and the calling number acquired by the calling number information acquisition unit, and
the call control device includes
  an emergency call reception unit configured to receive from the mobile station the emergency call in the form of the emergency call transmission signal,
  a prefix/calling number identification unit configured to identify the prefix and the calling number included in the emergency call transmission signal, and
  an emergency call control unit configured to determine how to treat the emergency call based on the prefix identified by the prefix/calling number identification unit, and to connect the emergency call to an emergency call answering point corresponding to the calling number based on the calling number identified by the prefix/calling number identification unit.

8. A mobile communication method implemented by a mobile station and a call control device configured to control connection of an emergency call initiated by the mobile station, the method comprising the steps of:
  causing the mobile station to acquire calling number information including
    a prefix indicating how to treat the emergency call, and
    a calling number being a telephone number of a called party;
  causing the mobile station to send the call control device the emergency call in the form of an emergency call transmission signal including
    the acquired prefix, and
    the acquired calling number;
  causing the call control device to receive from the mobile station the emergency call in the form of the emergency call transmission signal;
  causing the call control device to identify the prefix and the calling number included in the emergency call transmission signal; and
  causing the call control device to determine how to treat the emergency call based on the identified prefix, and to connect the emergency call to an emergency call answering point corresponding to the calling number based on the identified calling number.

* * * * *